United States Patent
Campbell

(10) Patent No.: US 6,332,184 B1
(45) Date of Patent: Dec. 18, 2001

(54) METHOD AND APPARATUS FOR MODIFYING MEMORY ACCESSES UTILIZING TLB ENTRIES

(75) Inventor: Paul W. Campbell, Oakland, CA (US)

(73) Assignee: ATI International, SRL, Barbados (BB)

(*) Notice: Subject to any disclaimer, the term of this patent is extended or adjusted under 35 U.S.C. 154(b) by 0 days.

(21) Appl. No.: 09/376,831

(22) Filed: Aug. 18, 1999

(51) Int. Cl.$^7$ ........................................... G06F 12/00
(52) U.S. Cl. ..................... 711/207; 711/153; 711/173; 711/205; 711/163
(58) Field of Search ................................ 711/207, 153, 711/173, 202, 203

(56) References Cited

U.S. PATENT DOCUMENTS 5,899,994 * 5/1999 Mohamed et al. ................... 707/100
6,157,986 * 12/2000 Witt ..................................... 711/118

* cited by examiner

Primary Examiner—Do Hyun Yoo
Assistant Examiner—Jasmine Song
(74) Attorney, Agent, or Firm—Vedder, Price, Kaufman & Kammholz

(57) ABSTRACT

A method and apparatus includes processing for modifying memory accesses, which begins by receiving a memory transaction. The processing continues by determining whether a translation look-aside table (TLB) entry exists for the memory access transaction. If a TLB entry does not exist, one is generated. Once a TLB entry exists for the memory access transaction, a transaction tag within the TLB is interpreted to identify an exception or a memory address space from a plurality of memory address spaces. The processing continues by interpreting the TLB entry to obtain a physical address when the tag identifies the memory address space. Having obtained the physical address, the memory address transaction is processed utilizing the physical address within the corresponding memory address space.

22 Claims, 5 Drawing Sheets

| translation look aside table 26 ||||||
|---|---|---|---|---|---|
| dirty bit | valid | virtual addr space | msb of virtual addr | MSBs of phys addr | transaction tag |
| 1 | 1 | vas 1 | msb 1 | msb 1 | - read from memory & write to PCI |
| 1 | 1 | vas 2 | msb 2 | msb 2 | - read from PCI & write to memory |
| 0 | 1 | vas 3 | msb 3 | msb 3 | - exception for emulation |
| 0 | 1 | vas 4 | msb 4 | msb 4 | - normal |
| 0 | 1 | vas 5 | msb 5 | msb 5 | - in SMM, data to/from PCI memory space |
| 0 | 1 | vas 6 | msb 6 | msb 6 | - in SMM, instr code from memory |
| 0 | 1 | vas 7 | msb 7 | msb 7 | - in SMM and exception, data to/from an exception |
| 0 | 1 | vas 8 | msb 8 | msb 8 | - in SMM and exception, instr code from memory | translation look aside table 26

| dirty bit | valid | virtual addr space | msb of virtual addr | MSBs of phys addr | transaction tag |
|---|---|---|---|---|---|
| 1 | 1 | vas 1 | msb 1 | msb 1 | - read from memory & write to PCI |
| 1 | 1 | vas 2 | msb 2 | msb 2 | - read from PCI & write to memory |
| 0 | 1 | vas 3 | msb 3 | msb 3 | - exception for emulation |
| 0 | 1 | vas 4 | msb 4 | msb 4 | - normal |
| 0 | 1 | vas 5 | msb 5 | msb 5 | - in SMM, data to/from PCI memory space |
| 0 | 1 | vas 6 | msb 6 | msb 6 | - in SMM, instr code from memory |
| 0 | 1 | vas 7 | msb 7 | msb 7 | - in SMM and exception, data to/from an exception |
| 0 | 1 | vas 8 | msb 8 | msb 8 | - in SMM and exception, instr code from memory |

FIG. 5

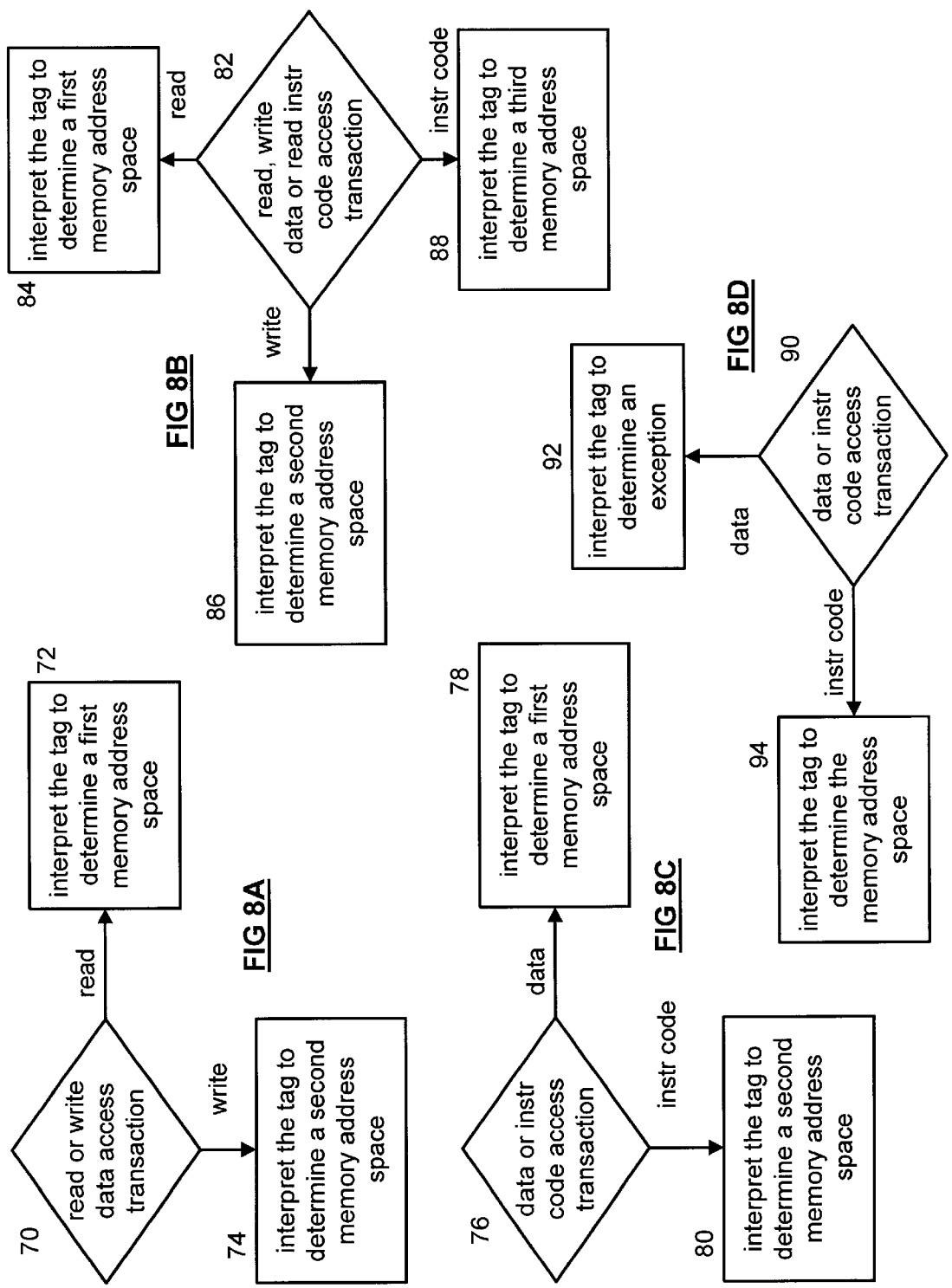

METHOD AND APPARATUS FOR MODIFYING MEMORY ACCESSES UTILIZING TLB ENTRIES

TECHNICAL FIELD OF THE INVENTION

This invention relates generally to computer architectures and more particularly to memory access transactions.

BACKGROUND OF THE INVENTION

FIG. 1 illustrates a schematic block diagram of a portion of a computer system. As shown, a central processing unit is coupled to cache memory and to a north bridge. The north bridge is coupled to memory, an accelerated graphics port (AGP) bus, and a PCI bus. To access the memory, the central processing unit communicates with the north bridge, which processes all memory accesses. To facilitate such communication, the central processing unit converts virtual addresses or linear addresses (i.e., the address space used by the CPU) into physical addresses.

To make such a conversion, the central processing unit often utilizes page address translations and includes a translation look aside table (TLB) for storing the conversions. Once the conversions are stored, the CPU uses the TLB for subsequent address translations. In general, page address translation utilizes a first part of the linear address to obtain a page directory entry. The page directory entry and a second portion of the linear address are used to obtain a page table entry. The page table entry and a third portion of the linear address are used to obtain the physical address.

The north bridge, upon receiving a physical address from the central processing unit, determines whether the address corresponds to memory, PCI address space, or AGP address space. If the address is directed towards the AGP address space, the north bridge makes a further translation of the received physical address utilizing a GART translation. The translated address is then stored in a GART TLB. If the address is within the PCI address space, the north bridge provides the address on to the PCI bus. If the address is within the memory address space, the address is sent to the memory.

FIG. 2 illustrates a graphical representation of address space within the system of FIG. 1. As shown, the system virtual (or linear) address space, which corresponds to the central processing unit, has memory spaces for input/output transactions, kernels and processes (i.e., running user applications). The system virtual addresses are converted to physical addresses as previously discussed. The physical address space includes PCI address space, AGP address space, main memory address space and DOS address space. The main memory address space corresponds to DRAM address space, while the PCI address space corresponds to PCI addresses along the PCI bus. The AGP address space corresponds to memory reserved for video graphics processing and the DOS space corresponds to operating system boot-up procedures. For example, the DOS base includes ROM BIOS space, a VGA (video graphics adapter) space, and a RAM space.

As is known, the system of FIG. 1 processes memory transactions that are targeted for different sections of the physical address space of FIG. 2. For example, some transactions only involve the memory, others only involve the PCI bus and still others involve both the memory and PCI bus (e.g., read from PCI and write to memory or vice-versa). Further, depending on the mode of operation of the system, the transactions involve different address spaces. For example, when the system is in certain modes of a system memory management (SMM) mode and is processing memory access transactions involving data (e.g., read and/or write data), the transaction utilizes the PCI bus. When the memory access transaction involves instruction codes (e.g., read an instruction code) the memory is utilized. Still further memory access transactions for component emulation (e.g., VGA emulation) access different memory spaces (e.g., the DOS memory space).

In the system of FIG. 1, the north bridge determines which memory space will be used for a given transaction. The north bridge makes these determinations on a transaction by transaction basis. Thus, each transaction requires the north bridge to perform processing steps to identify the particular address spaces to be utilized based on the type of transaction and the mode of the system. This occurs even if multiple transactions are accessing the same memory space and the system is in the same mode. As is generally understood in the art, efficiency of a computing system is enhanced by reducing the processing steps required to fulfill a transaction and by reducing redundant operations.

Therefore, a need exists for a method and apparatus that determines the address space or spaces used for like transactions and modes of operation, thereby eliminating the per transaction determination processing and improving a computing system's overall efficiency.

BRIEF DESCRIPTION OF THE DRAWINGS

FIG. 5 illustrates a translation look aside table in accordance with the present invention;

FIGS. 8A through 8D illustrate a logic diagram of a method for processing memory transactions in accordance with the present invention.

DETAILED DESCRIPTION OF A PREFERRED EMBODIMENT

Generally, the present invention provides a method and apparatus that includes processing for modifying memory accesses. Such processing begins by receiving a memory transaction. The processing continues by determining whether a translation look-aside table (TLB) entry exists for the memory access transaction. If a TLB entry does not exist, one is generated. Once a TLB entry exists for the memory access transaction, a transaction tag within the TLB is interpreted to identify an exception or a memory address space from a plurality of memory address spaces (e.g., DOS memory space, main memory space, AGP memory space, PC memory space, etc.). The processing continues by interpreting the TLB entry to obtain a physical address when the tag identifies the memory address space. Having obtained the physical address, the memory address transaction is processed utilizing the physical address within the corresponding memory address space. With such a method and apparatus, determination of which address space like transactions are accessing is done once and then cached within a TLB. By doing this, for subsequent like memory access transactions, a TLB entry is accessed to determine the corresponding memory space. This avoids the need for determining the corresponding address space on a transaction by transaction basis thereby reducing the processing steps to fulfill a memory access transaction thus improving the overall efficiency of the computing system.

Figure 3:
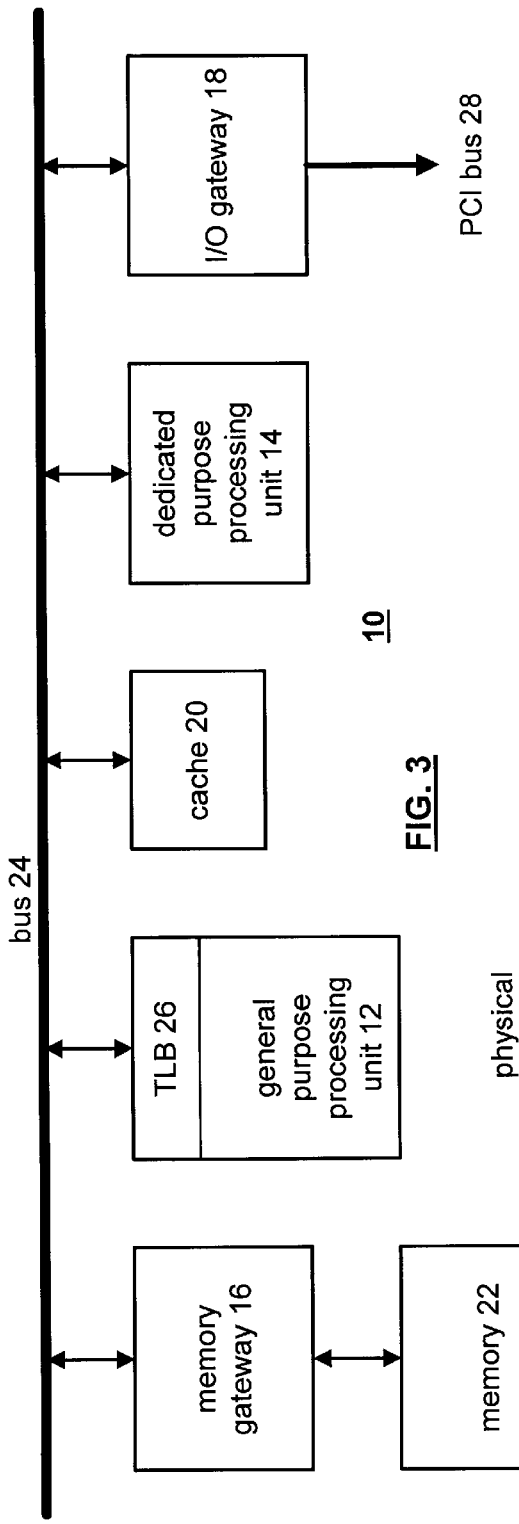
FIG. 3 illustrates a schematic block diagram of a computing system that processes memory accesses in accordance with the present invention.

The present invention can be more fully described with reference to FIGS. 3 through 8. FIG. 3 illustrates a schematic block diagram of a computing system 10 that includes a general purpose processing unit 12, a dedicated purpose processing unit 14, a memory gateway 16, an I/O (input/output) gateway 18, cache memory 20, main memory 22, and a global bus 24. The general purpose processor 12 is shown to include a translation look aside table (TLB) 26. As one of average skill in the art will appreciate, the dedicated purpose processor 14 may also include a translation look aside (TLB) table.

Figure 4:
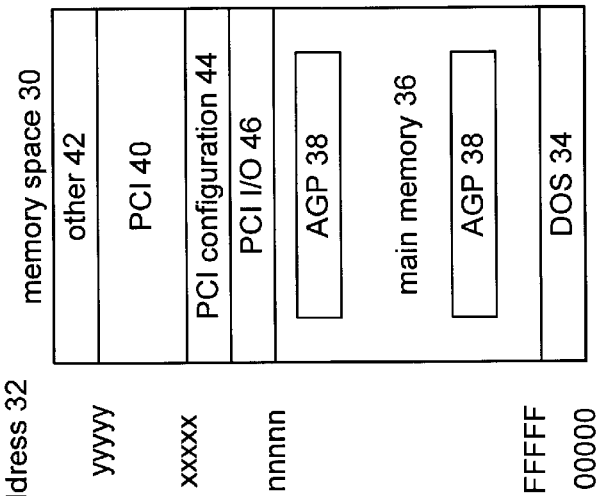
FIG. 4 illustrates the memory address spacing for the system of FIGS. 3.

The address space utilized by system 10 is illustrated in FIG. 4. The memory address space 30 includes DOS memory address space 34, main memory address space 36 which includes AGP memory address space 38 distributed within the main memory space 36, PCI I/O memory space 46, PCI configuration memory space 44, PCI memory space 40 and other memory spaces 42. Other memory spaces 42 may include restricted memory for processing of native operating system functions. Such native operating systems functions is further described in co-pending patent application entitled METHOD AND APPARATUS FOR RESTRICTING MEMORY ACCESS, having a Ser. No. 09/328,333, a filing date of Jun. 9, 1999 and is assigned to the same assignee as the present application.

The general purpose processing unit 12 functions in a similar manner as a central processing unit in a computing system. The dedicated purpose processing unit 14 may perform a dedicated process such as video graphics processing. The computing system 10 may include multiple general purpose processors 12 and/or multiple dedicated purpose processors 14. For a more detailed discussion of the general purpose processing unit 12 and the dedicated purpose processing unit 14 refer to the co-pending patent application entitled METHOD AND APPARATUS OF CONFIGURABLE PROCESSING, a filing date of Aug. 18, 1999, Ser. No. 09/376,830, and is assigned to the same assignee as the present application.

In the computing system 10, transactions are conveyed from one element to the other utilizing the physical address space. As such, when a memory access transaction is placed on the bus 24 by the general purpose processor 12 or the dedicated purpose processor 14, the address within the transaction is in the physical address space. In addition, the transaction will include an identifier for the particular element that is being targeted within the transaction. For example, if the general purpose processor 12 is issuing a read from main memory transaction, the transaction placed on bus 24 will include the physical address and the identity of the memory gateway 16. Such that, when the transaction is placed on the bus 24, the memory gateway 16 determines that the transaction is for itself and processes it accordingly. Note that if the central processing unit determines that the data of the requested memory transaction is cached, the transaction will target the cache memory 20 as opposed to the memory gateway 16.

As a further example, assume that the general purpose processing unit 12 has a transaction that is within the PCI memory space. In this instance, when the general purpose processing unit 12 places the transaction on the bus 24, the transaction will include the physical address space within the PCI address space and further identify the I/O gateway 18. As such, when the I/O gateway 18 detects the transaction on the bus, it determines that it is to process the transaction and forwards the transaction to the PCI bus 28. To facilitate the processing of memory access transactions, the general purpose processor 12 includes a translation look aside (TLB) 26.

FIG. 5 illustrates the translation look aside table 26. As shown, the TLB 26 includes a dirty bit field, a valid field, a virtual address space field, an MSB of virtual address field, a most significant bit of the physical address field and a transaction tag field. The TLB 26 may include additional fields such as an address extension, an exception field and other known fields used in the page address translation schemes. For a more detailed discussion of the TLB including an address extension field refer to co-pending patent application being entitled METHOD AND APPARATUS FOR RESTRICTING MEMORY ACCESS, having Ser. No. 09/328,333, filing date of Jun. 9, 1999, and is assigned to the same assignee as the present invention. For a detailed discussion of the translation look aside table including an exception field refer to co-pending patent application entitled METHOD AND APPARATUS FOR ADDRESS PAGING EMULATION, having Ser. No. 09/328,332, filing date of Jun. 9, 1999 and is assigned to the same assignee as the present invention. For a detailed discussion of the TLB including a further translation for address spacing, refer to co-pending patent application having a title of METHOD AND APPARATUS FOR VIRTUAL ADDRESS TRANSLATION, filing date of Jul. 14, 1999, Ser. No. 09/352,959 and is assigned to the same assignee as the present application.

The dirty bit field indicates whether the addressed memory block has data that needs to be flushed back to main memory. If the dirty bit is set (e.g., 1), the corresponding memory block has data to be flushed. If not set (e.g., 0), the corresponding memory block does not have data to be flushed back to main memory. As is known, when the data is retrieved for a particular transaction, a memory block, i.e., cache line or multiple cache lines, is retrieved from main memory and cached. As such, a plurality of memory locations each having an independent physical address is retrieved within a memory block when a single physical address is identified in a transaction.

The valid bit field indicates whether the particular entry in the TLB table 26 is valid. If the valid bit is set, e.g., 1, the corresponding entry is valid. If the valid bit is not set, e.g., 0, the corresponding entry is not valid. Entries become invalid when the address space changes, the mode of the system changes, e.g., changes from normal mode to system memory management mode (SMM) or vice-versa.

The transaction tag indicates for a corresponding entry the type of transaction to be processed. Such transactions include read from memory and write to the PCI bus, read from the PCI bus and write to memory, or perform an exception for emulation of a component of the computing system, e.g., emulate a video graphics adapter (VGA) function and/or emulation of an interrupt controller. As such, when performing such an emulation function, the DOS memory space 34 would be accessed. Still other transactions depend on the mode of operation of the computing system. For example, when the computing system is in a normal mode, the transaction is processed in accordance with the requests within the transaction. As such a read and/or write from memory is processed only utilizing the main memory address space. If, however, the computing system is in a system memory management (SMM) mode, different transactions may occur. For instance, for transactions involving data, the data is read from or written to the PCI memory space regardless of the physical address. For instruction codes, the instruction code is read from memory regardless of the physical address. While in the SMM mode, if the memory access transaction involves an exception, the corresponding data is read from and written to the particular exception handler and instruction codes are read from memory.

Figure 1:
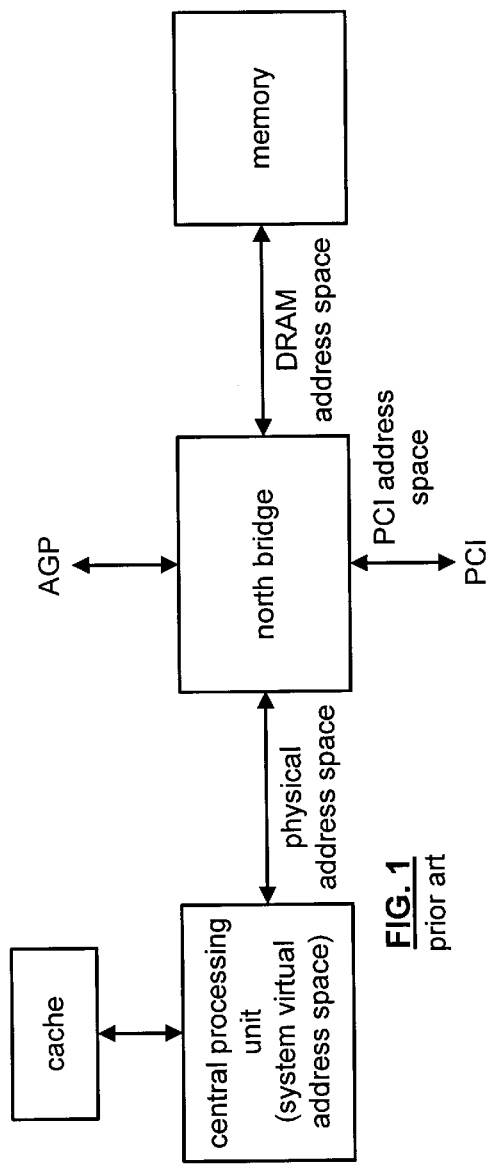
FIG. 1 illustrates a schematic block diagram of a prior art computing system.
Figure 2:
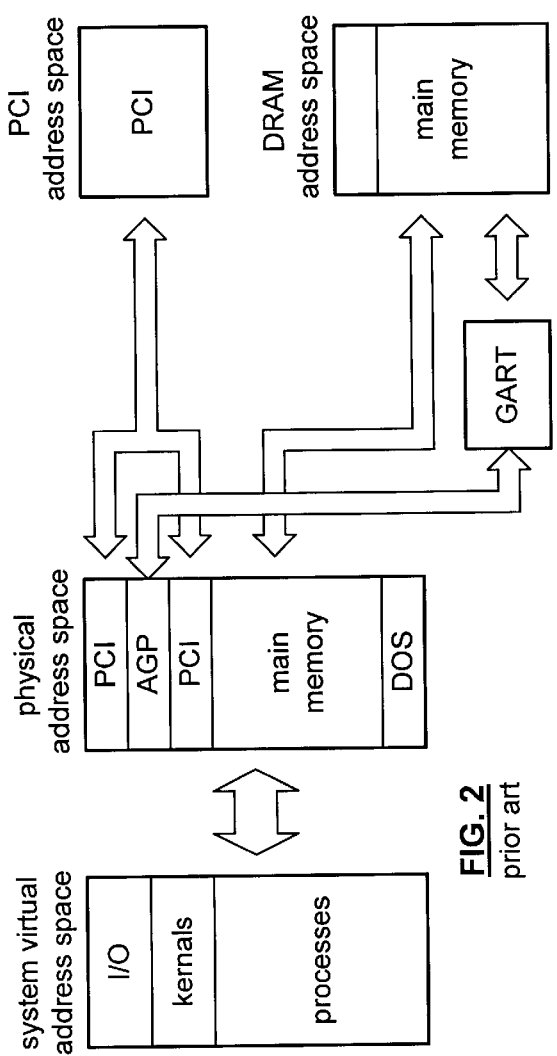
FIG. 2 illustrates a graphical representation of address spacing for the system of FIG. 1.

By including the transaction tag within the TLB table 26, the memory access transactions that are utilizing the corresponding memory access spaces only need to undergo one determination of the targeted memory address spacing. Once the targeted address spacing has been determined, it is stored in the transaction tag field. As such for subsequent like memory access transactions, the central processing unit 12, via its TLB 26, determines the targeted memory address spacing without further processing as required in the system of FIG. 1. As such processing steps to fulfill transactions are reduced thereby improving the overall efficiency of the system.

Figure 7:
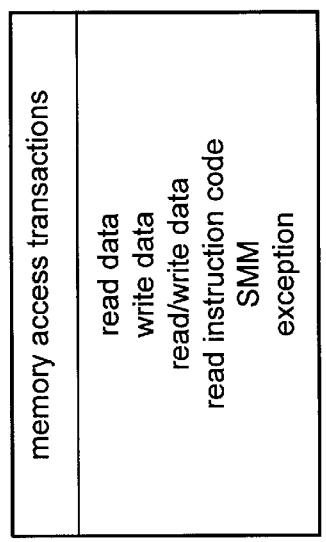
FIG. 7 illustrates a table of memory access transactions in accordance with the present invention.
Figure 6:
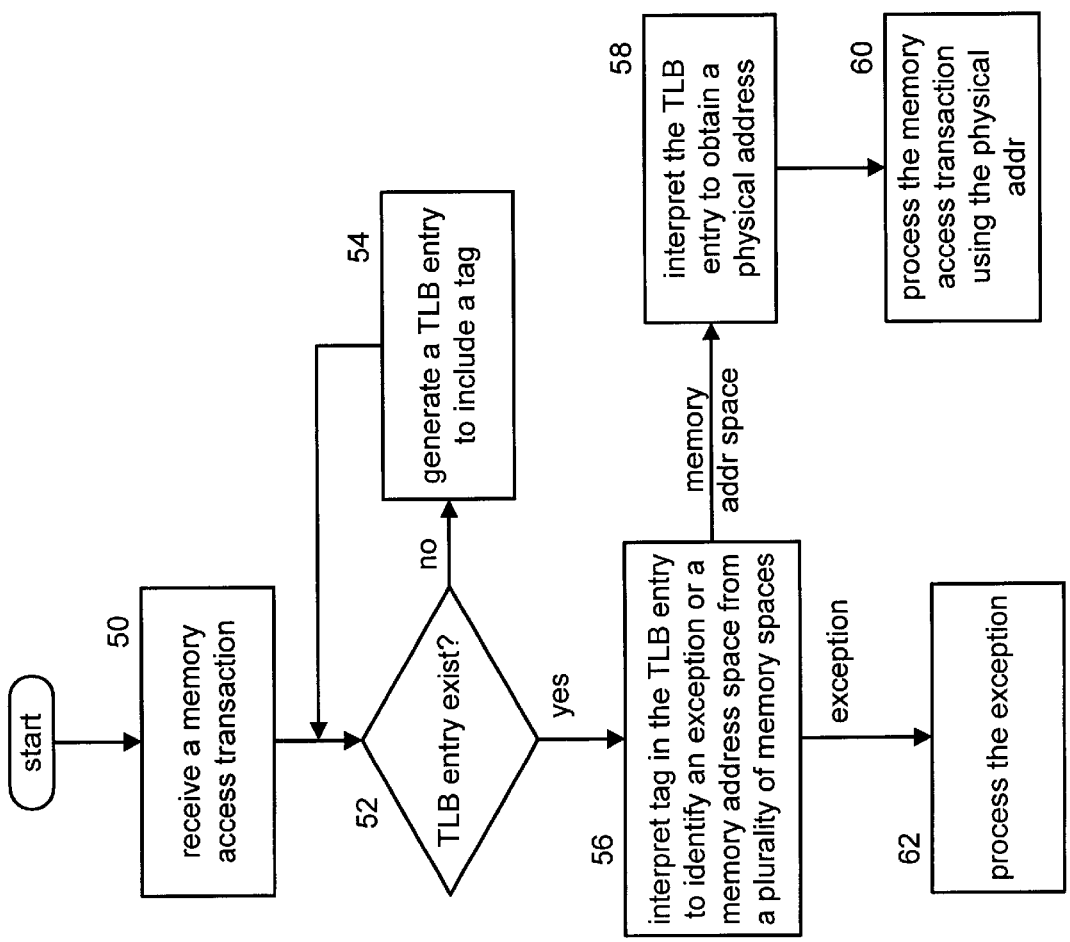
FIG. 6 illustrates a logic diagram of a method for performing memory accesses in accordance with the present invention.

FIG. 6 illustrates a logic diagram of a method for modifying memory accesses based on the type of transaction. The process begins at step 50 where a memory access transaction is received. The various types of memory access transactions are shown in the table of FIG. 7. Such transactions include read data from the PCI bus or memory, write data to the main memory or to the PCI bus, read and write data from main memory or the PCI bus. Read instruction codes from main memory, perform transactions while the system is in the system management mode and perform exceptions that cause the CPU to emulate particular functions, such as the video graphics adapter.

The process then proceeds to step 52 where a determination is made as to whether a TLB entry exists for the corresponding memory access transaction. If not, the process proceeds to step 54 where a TLB entry which includes the transaction tag is generated. Having done this, the process repeats at step 52.

When the TLB entry exists, the process proceeds to step 56 where the transaction tag is interpreted to identify an exception or a memory address space from a plurality of memory address spaces. When the tag identifies an exception, the process proceeds to step 62 where the exception is processed. Such an exception may be to emulate the video graphics adapter. To perform such an emulation, the central processing unit addresses the DOS memory space thereby generating corresponding transactions to directly address the DOS addressing space without further processing by an intervening entity such as a north bridge.

If the transaction tag identifies a memory address space, the process proceeds to step 58. At step 58, the TLB entry is further interpreted to identify a physical address. The process then proceeds to step 60 where the memory access transaction is processed utilizing the physical address. The processing of such memory access transactions will be discussed in greater detail with reference to FIGS. 8A through 8D.

FIG. 8A illustrates the processing of a memory transaction when the memory access transaction is a read or write data transaction that requires the data to be read from memory space and written to another memory space. For example, the data may be read from PCI memory space and written to main memory, or vice-versa. Such processing begins at step 70 where a determination is made as to whether the transaction is a read transaction or a write transaction. For a read transaction, the process proceeds to step 72 where the tag is interpreted to determine a first memory address space (e.g., PCI memory space, main memory space, AGP memory space, etc.). If, however, the transaction is a write transaction, the process proceeds to step 74 where the transaction tag is interpreted to determine a second memory access space. In this embodiment of processing the memory access transaction, read transactions are processed utilizing a different memory space than write transactions.

FIG. 8B illustrates the processing of a memory transaction that includes read data transactions, write data transactions, or read instruction code transactions. Each of these transactions is to be processed utilizing a different memory space. As such, the processing begins at step 82 where a determination is made as to whether the memory access transaction is a read data transaction, a write data transaction, or a read instruction code transaction. For a read data transaction, the process proceeds to step 84 where the tag is interpreted to determine a first memory address space. Having identified the address space, the central processing unit identifies the corresponding component coupled to the bus 24 that the data is to be read from.

When the transaction is a write data transaction, the process proceeds to step 86. At step 86, the tag is determined to identify a second memory address space. Having identified the second address space, the central processing unit identifies the corresponding component along the bus 24 that is to have the data written thereto. If the transaction is a read instruction code transaction, the process proceeds to step 88. At step 88, the transaction tag is interpreted to determine a third memory address space. Note that in the processing of FIG. 8B each of the three types of transactions is processed in different memory address spacing. For example, the read instruction code transactions may correspond to the PCI configuration space while the write data transactions are utilized in the PCI transaction space and the read data transactions are utilizing the main memory address space.

FIG. 8C illustrates the processing of data transactions and instruction code transactions. The processing begins at step 76 where a determination is made as to whether the transaction is a data transaction or an instruction code transaction. When the instruction is a data transaction, the processing proceeds to step 78 where the tag is interpreted to determine a first memory address space. If the transaction is an instruction code transaction, the process proceeds to step 80 where the tag is interpreted to determine a second memory address space. As such, in this processing of transactions, data transactions utilize a different memory space than instruction code transactions.

FIG. 8D illustrates the processing of data transaction and instruction code transactions. The processing begins at step 90 by determining whether the transaction is a data transaction or an instruction code transaction. If it is a data transaction, the processing proceeds to step 92 where the tag is determined to identify an exception handler to process the data. If, however, the transaction is an instruction code transaction, the process proceeds to step 94. At step 94, the tag is interpreted to determine the memory address space where the instruction code is to be read from.

Particular examples of the processing illustrated in FIGS. 8A through 8D include utilizing the PCI address space for read data or read instruction code transactions. When the memory access request is a write access transaction, the data is written to main memory address space at the physical address. As an alternate example, when the memory access transaction is a write access transaction, data is written to the PCI memory space at the physical address. When the memory access transaction is a read access transaction, data and/or instruction codes are read from the main memory space at the physical address. As a further example, when the memory access transaction is a data access transaction, the PCI memory address space is accessed at the physical address. When the memory access transaction is an instruction code transaction, the main memory space is accessed at the physical address. When the memory access transaction is the instruction code transaction, the main memory space is accessed at the physical address.

The preceding discussion has presented a method and apparatus for modifying memory access transactions based on the targeted memory address space. By generating fields within the translation look aside table to process such memory transactions, the processing steps to fulfill the transactions has been reduced in comparison with the system of FIG. 1. As such, by utilizing the TLB entry to perform such transactions, the overall efficiency of the computing system as shown in FIG. 3 is enhanced. As one of average skill in the art would appreciate, other embodiments may be derived from the teaching of the present invention without deviating from the scope of the claims or the spirit of the invention.

What is claimed is:

1. A method for modifying memory accesses, the method comprises the steps of:
   a) receiving a memory access transaction;
   b) determining whether a translation look aside table (TLB) entry exists for the memory access transaction;
   c) when the TLB entry exists, interpreting a transaction tag within the TLB entry to identify an exception or a memory address space from a plurality of address spaces without requiring knowledge of a memory access mode;
   d) when the transaction tag identifies the memory address space, interpreting the TLB entry to obtain a physical address; and
   e) processing the memory access transaction using the physical address within the memory address space.

2. The method of claim 1 further comprises determining whether the memory access transaction is a read access transaction or a write access transaction,
   when the memory access transaction is the read access transaction, interpreting the transaction tag within the TLB entry to determine a first memory address space from the plurality of address spaces; and
   when the memory access transaction is the write access transaction, interpreting the transaction tag within the TLB entry to determine a second memory address space from the plurality of address spaces.

3. The method of claim 1 further comprises determining whether the memory access transaction is an instruction code access transaction or a data access transaction,
   when the memory access transaction is the data access transaction, interpreting the transaction tag within the TLB entry to determine a first memory address space from the plurality of address spaces; and
   when the memory access transaction is the instruction code access transaction, interpreting the transaction tag within the TLB entry to determine a second memory address space from the plurality of address spaces.

4. The method of claim 1 further comprises determining whether the memory access transaction is a read data access transaction, write data access transaction, or a read instruction code access transaction,
   when the memory access transaction is the read data access transaction, interpreting the transaction tag within the TLB entry to determine a first memory address space from the plurality of address spaces;
   when the memory access transaction is the write data access transaction, interpreting the transaction tag within the TLB entry to determine a second memory address space from the plurality of address spaces; and
   when the memory access transaction is the read instruction code access transaction, interpreting the transaction tag within the TLB entry to determine a third memory address space from the plurality of address spaces.

5. The method of claim 1 further comprises interrupting the memory access transaction to process the exception when the transaction tag identifies the exception.

6. The method of claim 1, wherein the exception further comprises at least emulation of a video graphics adapter.

7. The method of claim 1 further comprises determining whether the memory access transaction is a data access transaction or an instruction code access transaction,
   when the memory access transaction is the data access transaction, interpreting the transaction tag within the TLB entry to determine the exception; and
   when the memory access transaction is the instruction code access transaction, interpreting the transaction tag within the TLB entry to determine the memory address space from the plurality of address spaces.

8. The method of claim 1, wherein the plurality of address spaces further comprises at least two of: PCI memory space, main memory space, PCI configuration space, PCI I/O address space, and local register space.

9. The method of claim 8 further comprises determining whether the memory access transaction is a read access transaction or a write access transaction,
   when the memory access transaction is the read access transaction, reading data or instruction codes from the PCI memory space at the physical address; and
   when the memory access transaction is the write access transaction, writing data to the main memory space at the physical address.

10. The method of claim 8 further comprises determining whether the memory access transaction is a read access transaction or a write access transaction,
    when the memory access transaction is the write access transaction, writing data to the PCI memory space at the physical address; and
    when the memory access transaction is the read access transaction, reading data or an instruction code from the main memory space at the physical address.

11. The method of claim 8 further comprises determining whether the memory access transaction is a data access transaction or an instruction code access transaction,
    when the memory access transaction is the data access transaction, accessing the PCI memory space at the physical address; and
    when the memory access transaction is the instruction code access transaction, accessing the main memory space at the physical address.

12. A memory access processing module comprises:
    a processing device; and memory operably coupled to the processing device, wherein the memory stores operational instructions that cause the processing device to: (a) receive a memory access transaction; (b) determine whether a translation look aside table (TLB) entry exists for the memory access transaction; (c) interpret a transaction tag within the TLB entry to identify an exception or a memory address space from a plurality of address spaces when the TLB entry exists without requiring knowledge of a memory access mode; (d) interpret the TLB entry to obtain a physical address when the transaction tag identifies the memory address space; and (e) process the memory access transaction using the physical address within the memory address space.

13. The memory access processing module of claim 12, wherein the memory further comprises operational instructions that cause the processing module to: determine whether the memory access transaction is a read access transaction or a write access transaction, when the memory access transaction is the read access transaction, interpret the transaction tag within the TLB entry to determine a first memory address space from the plurality of address spaces; and when the memory access transaction is the write access transaction, interpret the transaction tag within the TLB entry to determine a second memory address space from the plurality of address spaces.

14. The memory access processing module of claim 12, wherein the memory further comprises operational instructions that cause the processing module to determine whether the memory access transaction is an instruction code access transaction or a data access transaction, when the memory access transaction is the data access transaction, interpret the transaction tag within the TLB entry to determine a first memory address space from the plurality of address spaces; and when the memory access transaction is the instruction code access transaction, interpret the transaction tag within the TLB entry to determine a second memory address space from the plurality of address spaces.

15. The memory access processing module of claim 12, wherein the memory further comprises operational instructions that cause the processing module to determine whether the memory access transaction is a read data access transaction, write data access transaction, or a read instruction code access transaction, when the memory access transaction is the read data access transaction, interpret the transaction tag within the TLB entry to determine a first memory address space from the plurality of address spaces;

when the memory access transaction is the write data access transaction, interpret the transaction tag within the TLB entry to determine a second memory address space from the plurality of address spaces; and when the memory access transaction is the read instruction code access transaction, interpret the transaction tag within the TLB entry to determine a third memory address space from the plurality of address spaces.

16. The memory access processing module of claim 12, wherein the memory further comprises operational instructions that cause the processing module to interrupt the memory access transaction to process the exception when the transaction tag identifies the exception.

17. The memory access processing module of claim 12, wherein the exception further comprises at least one of: emulation of a video graphics adapter and emulation of an interrupt controller.

18. The memory access processing module of claim 12, wherein the memory further comprises operational instructions that cause the processing module to determine whether the memory access transaction is a data access transaction or an instruction code access transaction, when the memory access transaction is the data access transaction, interpret the transaction tag within the TLB entry to determine the exception; and when the memory access transaction is the instruction code access transaction, interpret the transaction tag within the TLB entry to determine the memory address space from the plurality of address spaces.

19. The memory access processing module of claim 12, wherein the plurality of address spaces further comprises at least two of: PCI memory space, main memory space, PCI configuration space, PCI I/O address space, and local register space.

20. The memory access processing module of claim 19, wherein the memory further comprises operational instructions that cause the processing module to determine whether the memory access transaction is a read access transaction or a write access transaction, when the memory access transaction is the read access transaction, read data or instruction codes from the PCI memory space at the physical address; and when the memory access transaction is the write access transaction, write data to the main memory space at the physical address.

21. The memory access processing module of claim 19, wherein the memory further comprises operational instructions that cause the processing module to determine whether the memory access transaction is a read access transaction or a write access transaction, when the memory access transaction is the write access transaction, write data to the PCI memory space at the physical address; and when the memory access transaction is the read access transaction, read data or an instruction code from the main memory space at the physical address.

22. The memory access processing module of claim 19, wherein the memory further comprises operational instructions that cause the processing module to determine whether the memory access transaction is a data access transaction or an instruction code access transaction, when the memory access transaction is the data access transaction, access the PCI memory space at the physical address; and when the memory access transaction is the instruction code access transaction, access the main memory space at the physical address.

* * * * *